United States Patent
Daniher et al.

(12) 
(10) Patent No.: US 6,451,366 B1
(45) Date of Patent: *Sep. 17, 2002

(54) EPOXYDECENAL ISOMERS

(75) Inventors: Andrew Daniher; Stefan Furrer, both of Cincinnati, OH (US); Andreas Goeke, Dubendorf (CH)

(73) Assignee: Givaudan SA (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/962,406

(22) Filed: Sep. 25, 2001

Related U.S. Application Data

(63) Continuation-in-part of application No. 09/706,993, filed on Nov. 6, 2000, now Pat. No. 6,335,047.

(51) Int. Cl.$^7$ .............................................. A23L 1/22
(52) U.S. Cl. ...................... 426/534; 426/533; 426/650
(58) Field of Search .......................... 426/89, 534, 533, 426/546, 650; 560/353

(56) References Cited

U.S. PATENT DOCUMENTS 6,335,047 B1 * 1/2002 Daniher et al. ............. 426/534

OTHER PUBLICATIONS

Alaiz, M., et al., *Comparative Antioxidant Activity of Maillard–and Oxidized Lipid–Damaged Bovine Serum Albumin*, J. Agric. Food Chem., 45, 3250–3254 (1997).

Buttery and Ling, *Additional Studies on Flavor Components of Corn Tortilla Chips*, J. Agric. Food Chem., 46, 2764–2769 (1998).

Chang, S., et al., *Regio– and Enantioselective Catalytic Epoxidation of Conjugated Polyenes: Formal Synthesis of LTA4 Methyl Ester*, J. Org. Chem., vol. 58, No. 25, pp. 1639–1641 and supplementary material (1993).

Gassenmeier and Schieberle, *Formation of the Intense Flavor Compound trans–4–5–expoxy–(E)–2–Decenal in Thermally Treated Fats*, JAOCS, vol. 71, No. 12 (Dec. 1994).

Guth and Grosch, *Deterioration of Soya–bean Oil: Quantification of Primary Flavour Compounds Using a Stable Isotope Dilution Assay*, Lebensm–Wiss u.–Technol., 23, 513–522 (1990).

Hinterholzer and Schieberle, *Identification of the Most Odour–active Volatiles in Fresh, Hand–extracted Juice of Valencia Late Oranges by Odour Dilution Techniques*, Flavour and Fragrance Journal, vol. 13, pp. 49–55 (1998).

Lin, J., et al., *Synthesis of trans–4,5–Epoxy–(E)–2–decenal and Its Deuterated Analog Used for the Development of a Sensitive and Selective Quantification Method Based on Isotope Dilution Assay with Negative Chemical Ionization*, Lipids, vol. 34, No. 10, pp. 1117–1126 (1999).

Ong, P.K.C., et al., *Charaterization of Volatiles in Rambutan Fruit (Nephelium Iappaceum L.)*, J. Agric. Food Chem., 46, 611–615 (1998).

Reiners and Grosch, *Odorants of Virgin Olive Oils with Different Flavor Profiles*, J. Agric. Food Chem., vol. 46, 2754–2763 (1998).

Schieberle and Buettner, *Systematic studies on the influence of the chemical structure on odor quality and odor potency in homologous series of long–chain aldehydes, ketones, and alcohols*, Book of Abstracts, 218th American Chemical Society National Meeting , New Orleans, Aug. 22–26 (1999),p. 2, AGFD–016 (Abstract only).

Schieberle and Grosch, *Potent odorants of the wheat bread crumb: Differences to the crust and effect of a longer dough fermentation*, Z Lebensm Unters Forsch, 192:130–135 (1991).

Wagner and Grosch, *Key Odorants of French Fries*, JAOCS, vol. 75, No. 10, pp. 1385–1392 (1998).

Zamboni, R., et al., *The Stereospecific Synthesis of 14S, 15S–Oxido 5Z,8Z,10E,12E–Eicosatetraenoic Acid*, Tetrahedron Letters, vol. 24, No. 45, pp. 4899–4902 (1983).

Zhang and Jacobsen, *Asymmetric Olefin Epoxidation with Sodium Hypochlorite Catalyzed by Easily Prepared Chiral Mn(III) Salen Complexes*, J. Org. Chem. 56, 2296–2298 (1991).

\* cited by examiner

Primary Examiner—Leslie Wong
(74) Attorney, Agent, or Firm—Wood, Herron & Evans, L.L.P.

(57) ABSTRACT

A method of producing a potent epoxydecenal flavorant. Trans-4,5-epoxy-(E)-2-decenal is enriched to contain at least 90% of the (−) isomer and is added to a product in an amount sufficient to flavor the product. The product may be a foodstuff, such as a food or beverage. Addition of the substantially pure (−)-trans-4,5-epoxy-(E)-2-decenal isomeric form achieves enhanced product taste and/or aroma, and provides increased economy and efficiency in its production.

12 Claims, 4 Drawing Sheets

EPOXYDECENAL ISOMERS

This application is a continuation-in-part of U.S. application Ser. No. 09/706,993, filed Nov. 6, 2000 now U.S. Pat. No. 6,335,047.

FIELD OF THE INVENTION

The invention relates generally to epoxydecenal compounds, and specifically to isomeric forms of epoxydecenal having enhanced flavor potency.

BACKGROUND

Epoxydecenal (trans-4,5-epoxy-(E)-2-decenal) ($C_{10}H_{16}O_2$, MW 168.24) is a known flavorant for foods, beverages, or other products. It enhances the flavor and/or odor of these products, making the products more desirable to the consumer. Epoxydecenal is formed from the degradation of fats, and is found in many foodstuffs, including both foods and beverages such as barley malt, French fries, olive oil, baguettes, peanut oil, hazelnut oil, pumpkinseed oil, rambutan fruit, puff pastries, wheat bread, cooked chicken, cooked beef, cooked pork, boiled salmon, cod, anchovy, oat meal, butter, buttermilk, French beans, oranges, and others.

The synthesis of epoxydecenal has been described. The compound was prepared by homologation of the precursor aldehyde epoxide using a Wittig reaction. Epoxydecenal exists in nature as a mixture of isomers. The epoxide may be in the cis or trans configuration. For the trans epoxide there are two possible isomers, the (S,S) isomer (FIG. 1A) and the (R,R) isomer (FIG. 1 B). The absolute configuration of these two isomers will be either (+) or (−) which is determined by the optical rotation. The substantially pure (S,S) isomer of epoxydecenal has been synthesized, as reported by Zamboni et al., as an intermediate in the total synthesis of 14S,15S-oxido 5Z,8Z, 10E, 12E-eicosatetraenoic acid (*Tetrahedron Letters,* 24:4899–4902 (1983)). The absolute configuration was deduced from a precursor of 2-deoxy-D-ribose.

The use of a catalyst to yield enantiomerically enriched mixtures of epoxydecenal has been reported by Jacobsen et al. (Chang, Lee, and Jacobsen, *J. Org. Chem.,* 58:6939–6941 (1993)). The report demonstrated the utility of this catalyst to perform regio- and enantioselective catalytic epoxidations, in which conjugated polyenes-cis alkenes are reacted in favor of trans alkenes. The catalytic reaction results in mainly the trans epoxide and yields a high enantiomeric enrichment. An enantiomerically enriched mixture of trans-4,5-epoxy-(E)-2-decenal was synthesized from the cis, trans-decadienol, with an enantiomeric excess (EE) of 83%. There was no mention or suggestion by Jacobsen et al. for using this compound as a flavor or ingredient, and the odor of the individual isomers ((−), (+) ) was not described.

Racemic mixtures of epoxydecenal have been synthesized for use as an odorant (Schieberle et al,. *Z Lebensm Unters Forsch* 192:130–135 (1991)and Lin et al., *Lipids* (1999), 34:1117–1126). In Schieberle, epoxidation of decadienal with 3-chloroperbenzoic acid yielded the epoxydecenal mixtures. The compound was prepared for evaluation as an odorant in wheat bread crumbs and for comparison of gas chromatography retention times with known samples. Lin synthesized epoxydecenal using a Wittig reaction as a key step. In both of these reports, there is no mention of the odor activity of the individual optical isomers. The odor of the geometric isomers (cis and trans) was described by Schieberle (Book of Abstracts, 218th American Chemical Society National Meeting, New Orleans, August 22–26 (1999), AGFD-016).

Among all the reports describing the use of epoxydecenal in foodstuffs, the publication by Buttery (*J. Agric. Food Chem.,* 46:2764–2769 (1998)), studying corn tortilla chips, mentioned the use of epoxydecenal isomers and stated that two isomers of 4,5-epoxy-(E)-2-decenal (labeled as isomer A and isomer B) were identified. Buttery neither teaches nor discloses the odor or potency of the individual isomers.

A method to enhance intensity of an epoxydecenal flavorant taking advantage of activity of epoxydecenal isomers is desirable.

SUMMARY OF THE INVENTION

The invention is directed to an epoxydecenal flavorant composition having increased potency. The composition contains epoxydecenal that has been enriched to contain at least about 90% of the (−) isomeric form. In some embodiments, the composition may contain up to about 99% of the (−) isomeric form. The composition may be used to flavor foodstuffs, such as foods and beverages, or it may be used in other products such as health care products and pharmaceuticals. It may be added as a neat compound, in a solvent, in a solid form, or in an encapsulated form.

The invention is also directed to a method of flavoring a product with epoxydecenal (trans-4,5-epoxy-(E)-2-decenal). In the method, epoxydecenal (trans-4,5-epoxy-(E)-2-decenal) that has been enriched to contain at least about 90% of the (−) isomeric form is added in an amount sufficient to flavor the product. The amount may be in the range of 0.001 ppb to 100 ppm. The product may be a foodstuff.

The composition provides an epoxydecenal (trans-4,5-epoxy-(E)-2-decenal) flavorant with enhanced intensity, permitting a lower concentration of the flavorant to achieve a desired product taste and/or aroma. This results in a more efficient and economical product. These and other embodiments and advantages of the invention will be apparent in light of the following figures and detailed description.

DETAILED DESCRIPTION

Until now, the desired taste and/or odor imparted by epoxydecenal (trans-4,5-epoxy-(E)-2-decenal) was due to the racemic mixture of its (−) and (+) isomers. It is the (−) isomer, compared to the (+) isomer, that imparts a more intense flavor and/or odor to products, such as foodstuffs. A more intense flavor and/or odor is defined as one that produces a relatively higher-impact taste and/or aroma in comparison to another flavor. Lesser amounts of the (−) form, therefore, can be used to achieve enhanced product taste and/or aroma. This is more cost effective (greater activity per unit of weight), more production efficient, has broader applicability, and results in a more desirable product taste.

Thus, one embodiment of the invention is a method to achieve a substantially pure (−) isomeric form. The synthesis of this enantiomerically enriched (−) form is shown in the following sequence.

Synthesis of Enantiomerically Enriched Epoxydecenal

Step 1: Synthesis of Compounds A and A[1] deca-trans-2-cis-4-dien-1-ol

Figure 2A:
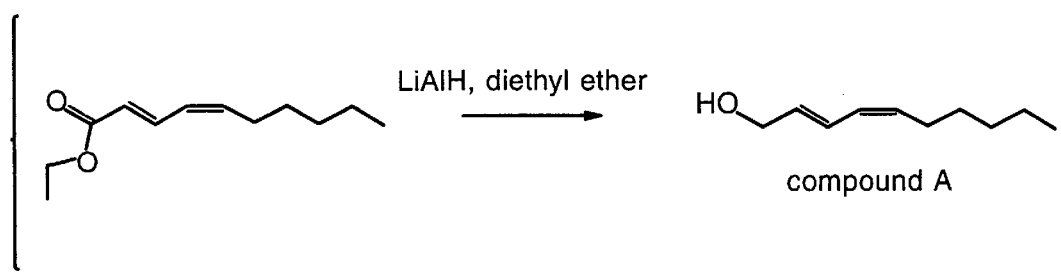
FIGS. 2A, 2B, 2C and 2D show the individual steps in synthesizing enantiomerically enriched epoxydecenal.

With reference to FIG. 2A, to a 750 mL 3-neck flask under nitrogen was added 4.16 g of lithium aluminum hydride (110 mmol) (0.55 eq.) (LiAlH$_4$, 37.9, Chemmetall) and 300 mL diethyl ether (Fluka, purris). Ethyl decadienoate, 39.24 g (200 mmol) in 80 mL diethyl ether (Fluka, puriss) was added over a period of 45 min, between 33–35° C. After the addition 120 mL diethyl ether (Fluka, puriss) was added. The grey suspension was stirred for 18 h (overnight) at room temperature. Water was added to the grey suspension under careful ice cooling until the grey color disappeared. The mixture was extracted twice with ether. The organic layers were washed with NaCl (saturated), dried over MgSO$_4$ and concentrated (down to 0.3 torr). From this, 30.83 g of a slightly yellow liquid (COMPOUND A) was recovered (100% yield).

Step 2: Synthesis of Compound B acetic acid deca-trans-2-cis-4-dienyl-ester

Figure 2B:
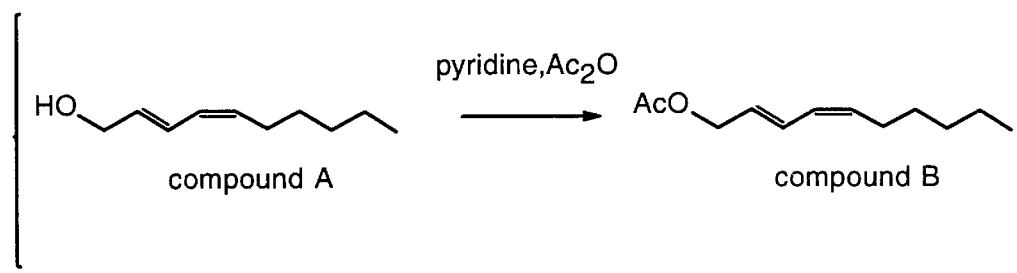

With reference to FIG. 2B, to a 500 mL 3-neck flask under nitrogen was added 15.43 g of COMPOUND A (100.0 mmol), 50 mL of pyridine (Fluka, puriss, $C_5H_5N$, 79.10) and 20.42 g of acetic anhydride (200.0 mmol) (2 eq.) (Fluka, puriss, $C_4H_6O_3$, 102.86) were added. The mixture was stirred at room temperature for 3 h. The mixture was poured on ice, acidified with HCl (concentrated), and extracted twice with ether. The organic layers were washed with NaHCO$_3$ (saturated), dried over MgSO$_4$ and concentrated (to 0.3 torr). From this, 19.6 g of a yellow liquid (COMPOUND B) was recovered (100% yield).

Figure 2C:
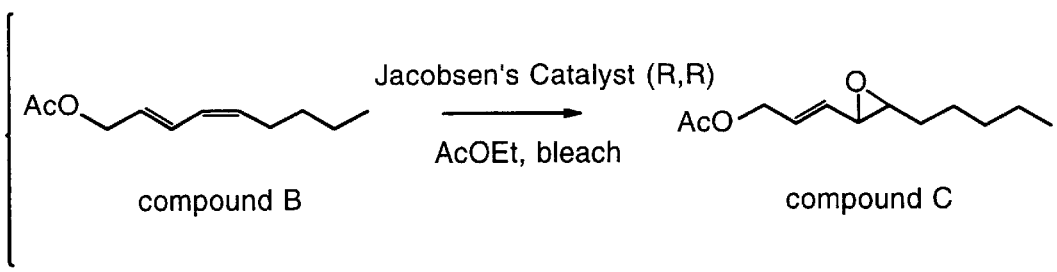

Step 3: Synthesis of Compound C (−)-acetic acid 3-(3-pentyl-trans-oxiranyl)-allyl ester With reference to FIG. 2C, following a similar procedure reported in *J. Org. Chem.* 58:6939 (1993) and *J. Org. Chem.* 56:2296 (1991), to a 1000 mL flask with a magnetic stir bar was added 9.50 g of COMPOUND B (48.40 mmol), 300 mL of ethyl acetate (Fluka, puriss) and 1.23 g of 4,4-Jacobsen Catalyst (R,R)-(−)-N,N'-bis(3,5-di-tert-butylsalicylidene)-1,2-cyclohexanediamino-manganese (III) chloride (1.9360 mmol) (0.04 eq.) (Fluka, $C_{36}H_{52}ClMnN_2O_2$, 635.22) were added. After cooling in an ice bath 352 mL of NaOCl buffer (0.55 M, pH 11.3) 10 mL Na$_2$HPO$_4$ (0.05 M), 10.6 g NaOCl (12–15% in water) diluted to 25 mL and adjusted to pH 11.3 (193.06 mmol) (4.0 eq.) were added. The black mixture was stirred for 7 h at 0° C. and 13.5 h at room temperature. The mixture was extracted twice with ethyl acetate. The organic layers were washed with NaCl (saturated), dried over MgSO$_4$ and concentrated. The brown liquid was filtered through triethyl amine deactivated silica gel with ether/hexane (10/90). During the filtration through silica the catalyst is separated from the product and is not carried to the next step. The catalyst may be recycled for economic reasons. It is also possible to use 4-phenyl pyridine-N-oxide as a co-catalyst (0.20 eq) and, when used, slightly better enantiomer excesses (EE) and trans epoxide to cis epoxide ratios were obtained. The filtrate was concentrated (down to 0.3 torr) and, from this, 10.83 g of a brown liquid was recovered (some of the catalyst remained in this liquid). The catalyst which remained on the column was washed off with ether and crystallized in ether/hexane, with 0.12 g dark brown crystals recovered.

Figure 2D:
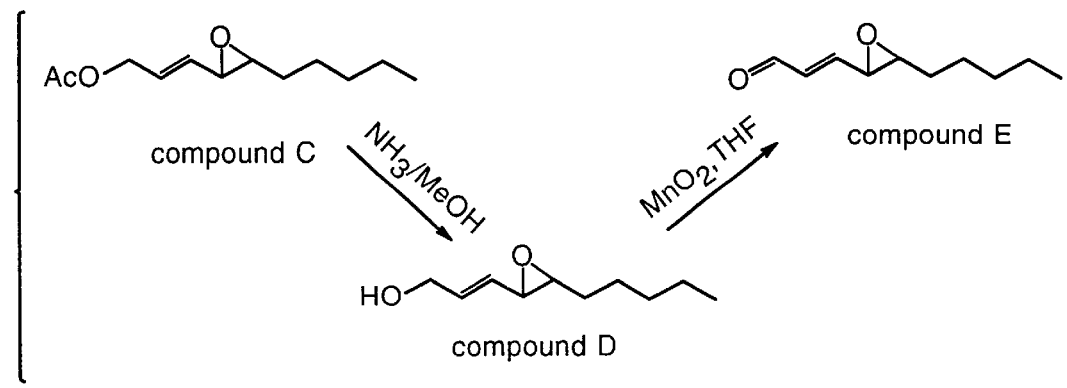

Step 4: Synthesis of Compounds D and E 3-(3-pentyl-trans-oxiranyl)-prop-2-en-1-ol and (−)-trans-4,5-(E)-2-decenal With reference to FIG. 2D, to a 500 mL flask with a magnetic stir bar was added 10.5 g of COMPOUND C (48.40 mmol), 100 mL of methanol (Riedel de Haen, dried) and 242 mL of a methanolic ammonia solution (484 mmol) (10 eq.) (Aldrich, 2 M in methanol) under cooling. The mixture was stirred at room temperature for 20 h. The mixture was concentrated at room temperature to yield COMPOUND D, which was used directly for the oxidation. To the oil in the 500 mL flask was added under nitrogen 300 mL of tetrahydrofuran (Fluka, absolute, over molecular sieve) and 24.98 g of manganese (IV) oxide (286.4 mmol) (6.4 eq.) (Merck, precipitated active for synthesis, vacuum dried, MnO$_2$, 86.94) was added. The mixture was stirred at room temperature for 80 h. The mixture was filtered through triethyl amine deactivated silica gel (hexane/ether, 90/10). During the filtration through silica the starting material is separated from the product for a successful distillation. The fractions containing the product were concentrated and distilled twice to give 2 g of the product (COMPOUND E) as a light yellow oil (26.6% yield over the last two steps).

Separation and Potency Evaluation of Epoxydecenal Isomers

Chirality is based on the phenomenon of isomerism, in which two compounds may have the same composition but the arrangement of the atoms is different, resulting in molecular structures, termed enantiomers, that are the mirror images of one another. Frequently, one isomer exhibits a different activity than the other and may even inhibit the other. For example, the (+) isomer of carvone has a caraway-like odor, and the (−) is more spearmint-like. In pharmaceuticals, one chirally pure compound may have fewer unwanted side-effects and greater activity, allowing for lower dosages.

Figures 1A, 1B:
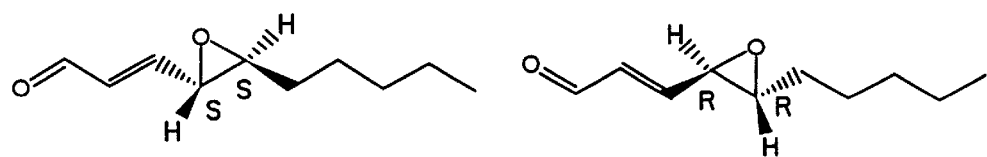
FIG. 1A shows the chemical structure of the epoxydecenal S,S isomer.
FIG. 1B shows the chemical structure of the epoxydecenal R,R isomer.
Figure 3:
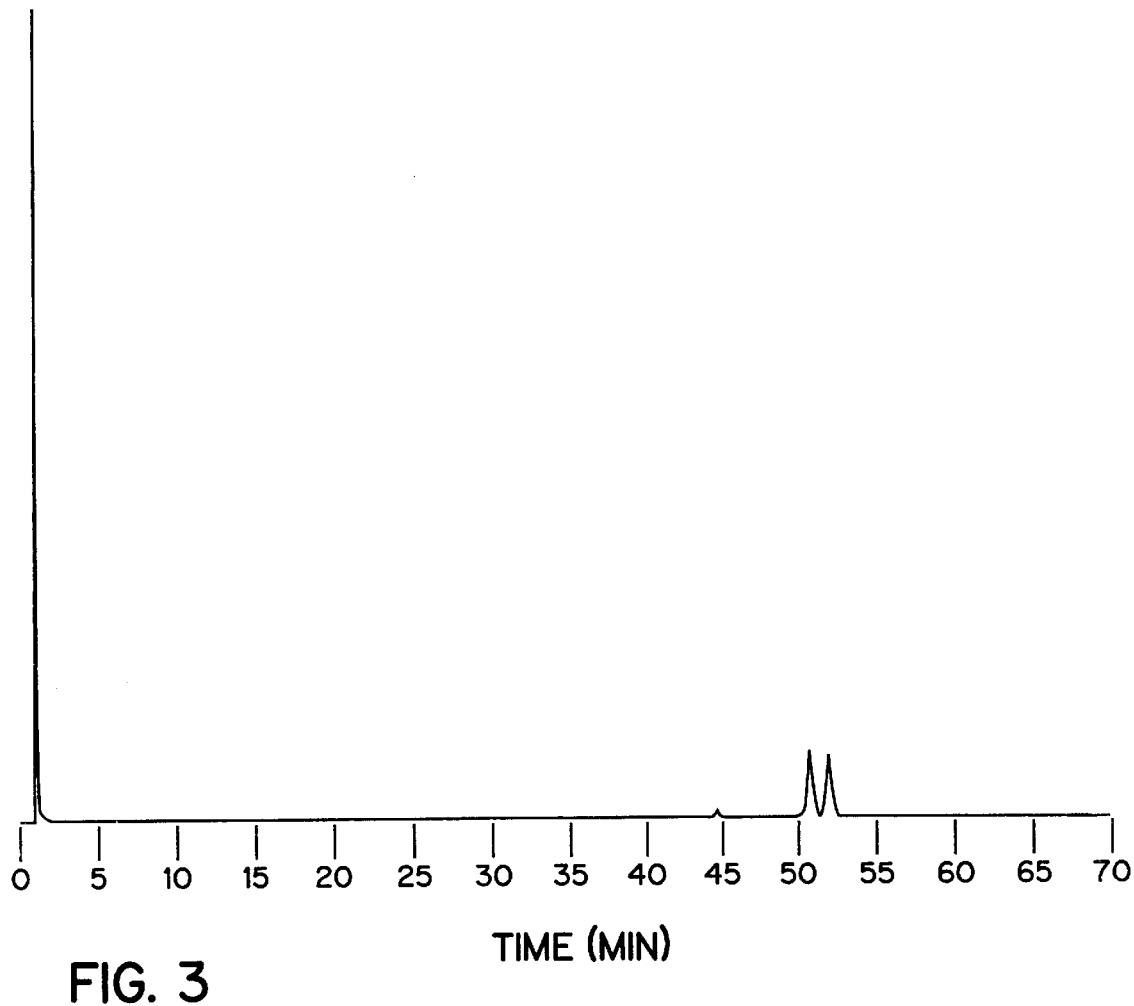
FIG. 3 shows a chromatogram of racemic epoxydecenal separated by gas chromatography (GC) using a chiral column.

We first synthesized trans-4,5-epoxy-(E)-2-decenal as a racemic mixture of isomers (not described). The individual isomers were separated from each other by gas chromatography (GC) using a chiral column, specifically a Hydrodex-b-3P 25 m×0.25 mm column using a 110° C. isotherm, with 60 kPa H$_2$ as a carrier gas and a 1:50 split. As shown in FIG. 3, two peaks were obtained. The first peak had a retention time of 50.68 min and was present at a concentration of 50.99%. The second peak had a retention time of 51.92 min and was present at a concentration of 49.01%.

The GC apparatus was equipped with a port to allow access to the odor from particular fractions eluted from the chromatography column ("sniff port"). By separating the two isomers and evaluating the odor of each, it was determined that the second fraction to elute had a more potent odor and was the dominant contributor to the overall odor of the mixture. The second-eluting fraction was the (−) isomer, as will be described.

Three sets of trans-4,5-(E)-2-decenal were synthesized: the racemic mixture, the set enriched in the (−) isomer, and the set enriched in the (+) isomer. The result of the sensory evaluation of the epoxydecenal isomers in water by one flavorist is as follows:

| Isomer | Concentration (parts per billion) | Odor/Taste | Rating |
|---|---|---|---|
| (+/−) | 0.02 | no smell, very faint metallic taste | medium |
|  | 0.20 | clear metallic smell and taste |  |
|  | 20.00 | strong metallic and green bean taste |  |
| (+) | 0.02 | no smell, no taste | weakest |
|  | 0.20 | mild metallic smell and taste |  |
|  | 20.00 | clear metallic and bean taste/smell |  |
| (−) | 0.02 | faint smell, mild metallic taste | strongest |
|  | 0.20 | strong metallic smell/taste |  |
|  | 20.00 | strong metallic and bean taste/smell |  |

The profile in all the samples was more or less the same, with the (−) isomer being at least 3–5 times stronger than the (+/−) racemate and 10 times stronger than the (+) isomer.

Another flavorist used the (−) isomer in several different flavors at 2 ppb. It made a raspberry flavor fuller and juicier. It gave an apple flavor a more natural green note and it gave a rye bread flavor a more fresh bread character.

Enantiomerically enriched mixtures containing the individual isomers were synthesized. The synthetic scheme shown in FIG. 4 was followed, using Jacobsen's epoxidation catalyst. The R,R catalyst yielded trans-4,5-epoxy-(E)-2-decenal with an enantiomeric excess (EE) of 83.2%. The S,S catalyst yielded an EE of 84.3%. Each enriched isomer was then analyzed, using the same chiral GC column and conditions as previously described for the mixture. The results are shown in FIG. 5 and FIG. 6.

Figure 5:
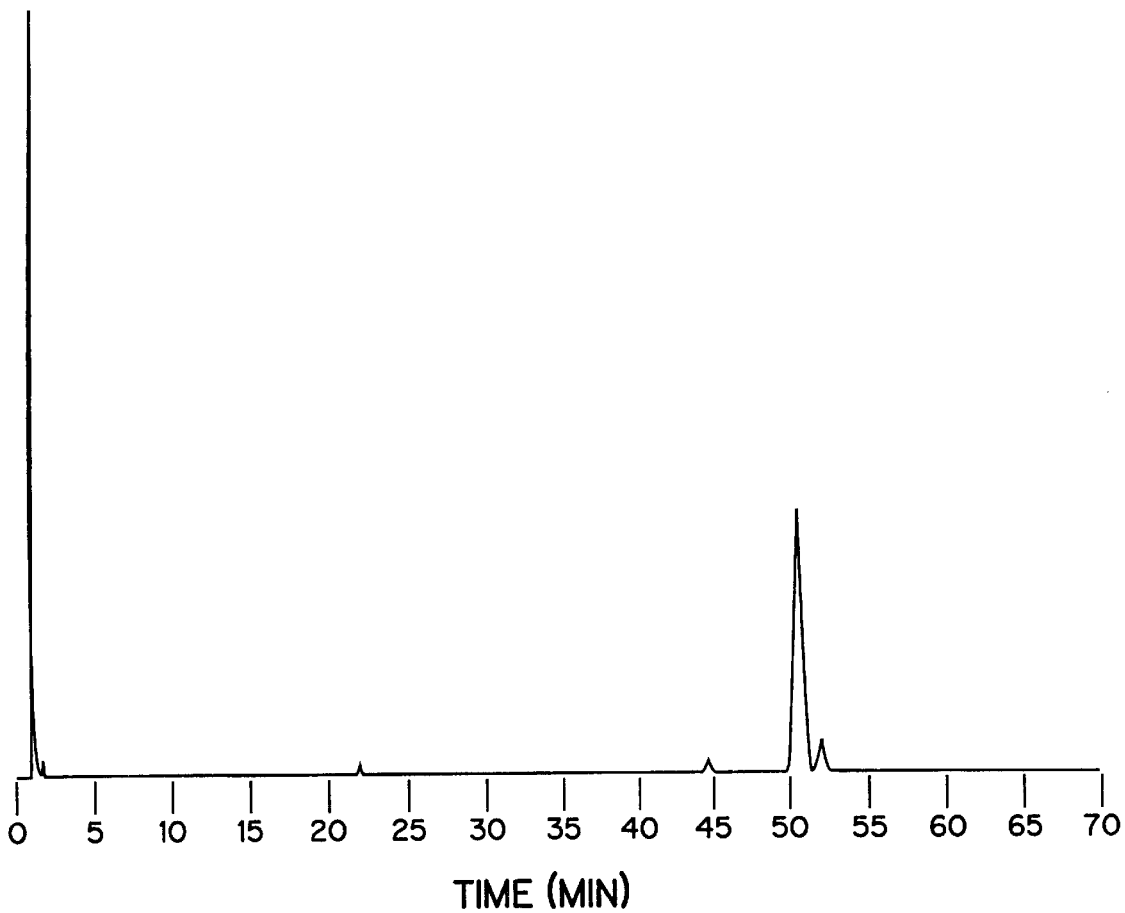
FIG. 5 shows a chromatogram of epoxydecenal synthesized using an S,S catalyst and separated by GC using a chiral column.

With reference to FIG. 5, the GC separation is shown using a chiral column to which the isomer synthesized using the S,S catalyst was applied. The major peak, having a relative concentration of 86.66%, had a retention time of 50.60 min. This closely corresponded to the first peak in FIG. 3 which had a retention time of 50.68 min. Thus, the first peak in FIG. 3 was identified as the (+) isomer.

Figure 6:
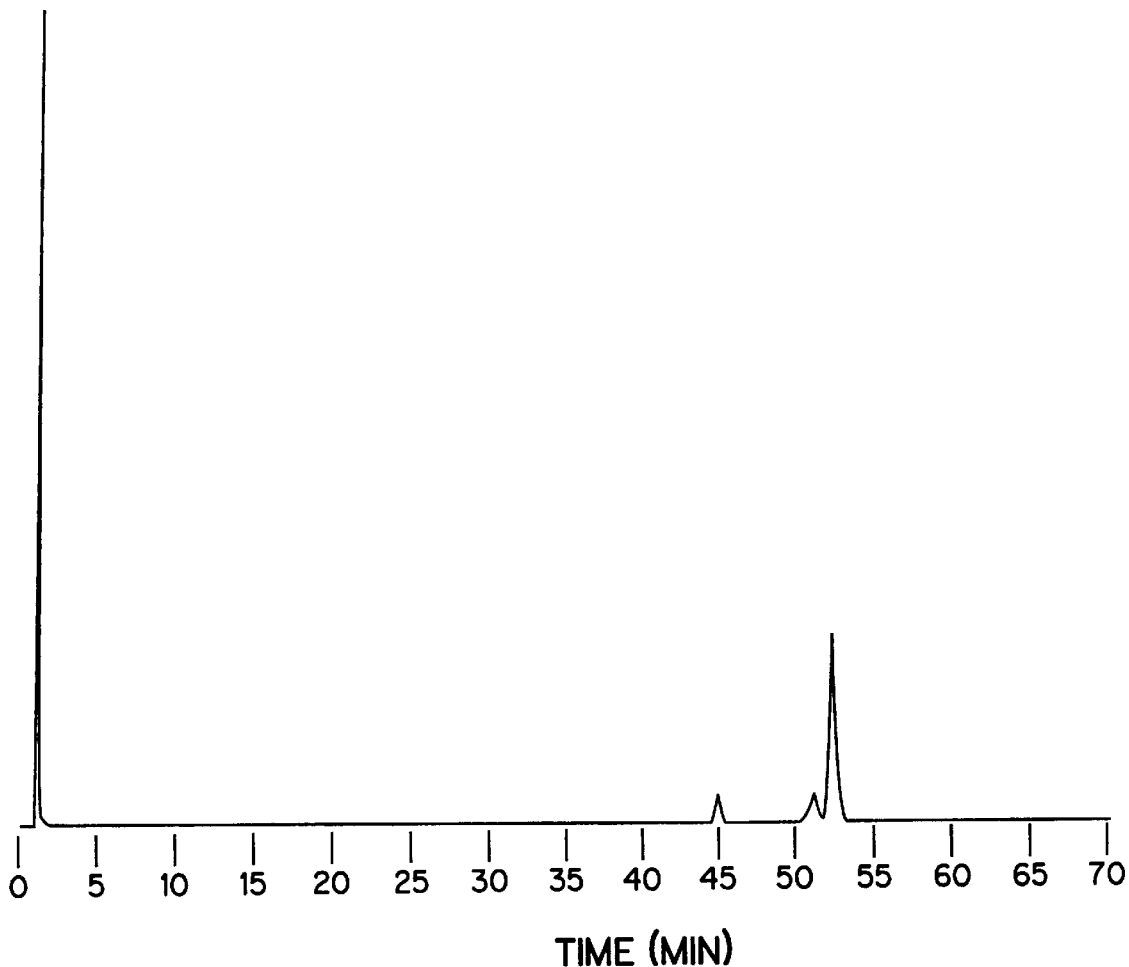
FIG. 6 shows a chromatogram of epoxydecenal synthesized using an R,R catalyst and separated by GC using a chiral column.

With reference to FIG. 6, the GC separation is shown using a chiral column to which the isomer synthesized using the R,R catalyst was applied. The major peak, having a relative concentration of 80.69%, had a retention time of 51.85 min. This closely corresponded to the second peak in FIG. 3 which had a retention time of 51.92 min. Thus, the second peak in FIG. 3 was identified as the (−) isomer.

Figure 4:
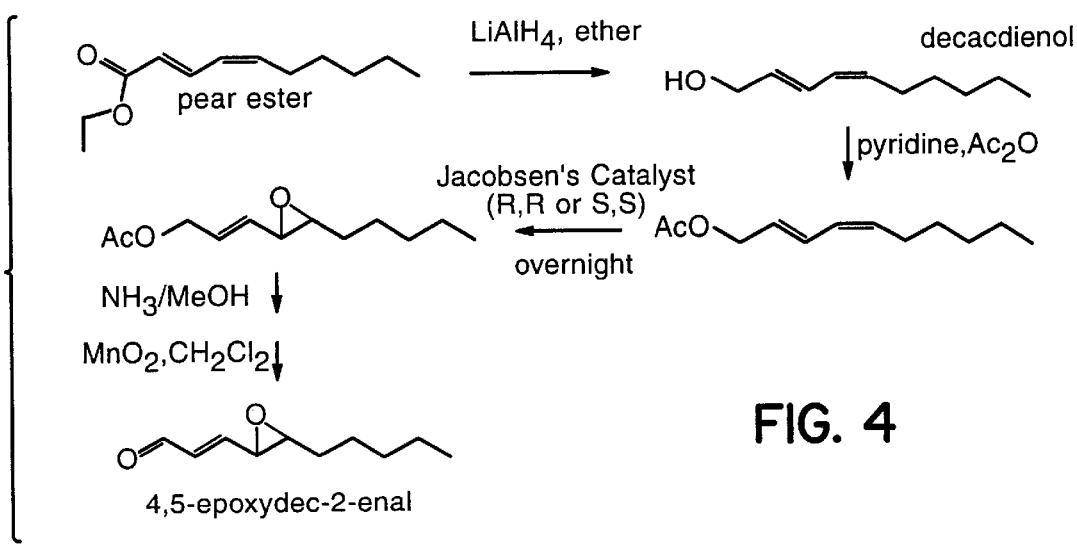
FIG. 4 shows the synthetic scheme for enantiomerically enriched mixtures of trans-4,5-epoxy-(E)-2-decenal.

The (−) isomer may be diluted in various solvents such as triacetin, ethanol, water, etc., to obtain the desired concentration used in a flavor matrix. A trained flavor scientist determined that the more potent odor was due to the isomer that had been synthesized as shown in FIG. 4 using the R,R catalyst.

The optical activity of the compounds, that is, if it is (−) or (+), was determined by polarimetry. Polarimetric measurements were performed on enantiomerically enriched epoxydecenal synthesized using either the S,S and R,R catalysts to further characterize the isomers. Samples of each isomer dissolved in 1 ml of solvent were added to a 10 cm quartz cell and were analyzed at a temperature of 22° C. For epoxydecenal synthesized using the S,S catalyst, a 13.65 mg sample was dissolved in methyltertbutyl ether (MTBE) to a concentration of 0.68. For epoxydecenal synthesized using the R,R catalyst, a 17.16 mg sample was dissolved in MTBE to a concentration of 0.86. The results are as follows.

For the compound prepared with the S,S Jacobsen's catalyst, the optical rotation $[\alpha]^{22}_D$ was +31.6° (41 mM, MTBE). For the compound prepared with the R,R Jacobsen's catalyst, the optical rotation $[\alpha]^{22}_D$ was −31.6° (51 mM, MTBE). The same extent of optical rotation in different directions indicated that there was about the same amount of the (−) isomer in one fraction as there was the (+) isomer in the other fraction.

The absolute configuration of the (−) isomer of trans-4,5-epoxy-(E)-2-decenal was determined. Zamboni et al. reported the optical rotation of the (S,S) isomer of trans-6,7-epoxy-(E,E)-2,4-dodecadienal $[\alpha]^{22}_D$−27.7° (C=1, CHCl$_3$) that was made from the (5S,) isomer of trans4,5-epoxy-(E)-2-decenal. Using a similar procedure, we converted the (−) isomer of trans-4,5-epoxy-(E)-2-decenal to trans-6,7-epoxy-(E,E)-2,4-dodecadienal. The optical rotation for this compound was $[\alpha]^{22}_D$−20.4° (C=1.01, 52 mM, MTBE). Since the rotation for both of the trans-6,7-epoxy-(E,E)-2,4-dodecadienals was negative, the absolute configuration of the disclosed molecule is the same as the (S,S) molecule reported by Zamboni et al. The absolute configuration of the (−) isomer of trans4,5-epoxy-(E)-2-decenal is therefore (S,S).

A substantially pure (−) isomer of trans4,5-epoxy-(E)-2-decenal is defined as one that is enriched to have at least about 90% of the (−) form, with the remainder being the (+) form. However, purity of greater than 90%, up to about 99% enrichment of the (−) isomer, may be obtained. This constitutes 90% to 80% of the total mixture. The mixture may contain 10–20% of cis-4,5-epoxy-(E)-2-decenal.

It should be understood that the embodiments of the present invention shown and described in the specification are only preferred embodiments of the inventors who are skilled in the art and are not limiting in any way. Therefore, various changes, modifications or alterations to these embodiments may be made or resorted to without departing from the spirit of the invention and the scope of the following claims.

What is claimed is:

1. A process for enhancing the flavor of products comprising adding a flavor enhancing amount in the range of about 0.001 ppb to about 100 ppm of epoxydecenal that has been enriched to contain a substantially pure (−)-trans4,5-epoxy-(E)-2-decenal.

2. The process of claim 1 wherein trans-4,5-epoxy-(E)-2-decenal is enriched to contain at least about 90% of said substantially pure (−) isomer.

3. The process of claim 1 wherein trans-4,5-epoxy-(E)-2-decenal is enriched to contain at least about 99% of said substantially pure (−) isomer.

4. The process of claim 1 wherein said product is a foodstuff.

5. The process of claim 1 wherein said isomer is added as a neat compound.

6. The process of claim 1 wherein said isomer is added in a solvent.

7. The process of claim 1 wherein said isomer is added in a solid form.

8. The process of claim 1 wherein said isomer is added in an encapsulated form.

9. A product containing a flavor enhancing amount of about 0.001 ppb to about 100 ppm of epoxydecenal that has been enriched to contain a substantially pure (−)-trans-4,5-epoxy-(E)-2-decenal.

10. The product of claim 9 wherein said trans-4,5-epoxy-(E)-2-decenal is enriched to contain at least about 90% of said substantially pure (−) isomer.

11. The product of claim 9 wherein said trans-4,5-epoxy-(E)-2-decenal is enriched to contain at least about 99% of said substantially pure (−) isomer.

12. The product of claim 9 wherein said product is a foodstuff.

* * * * *